Patented Jan. 10, 1933

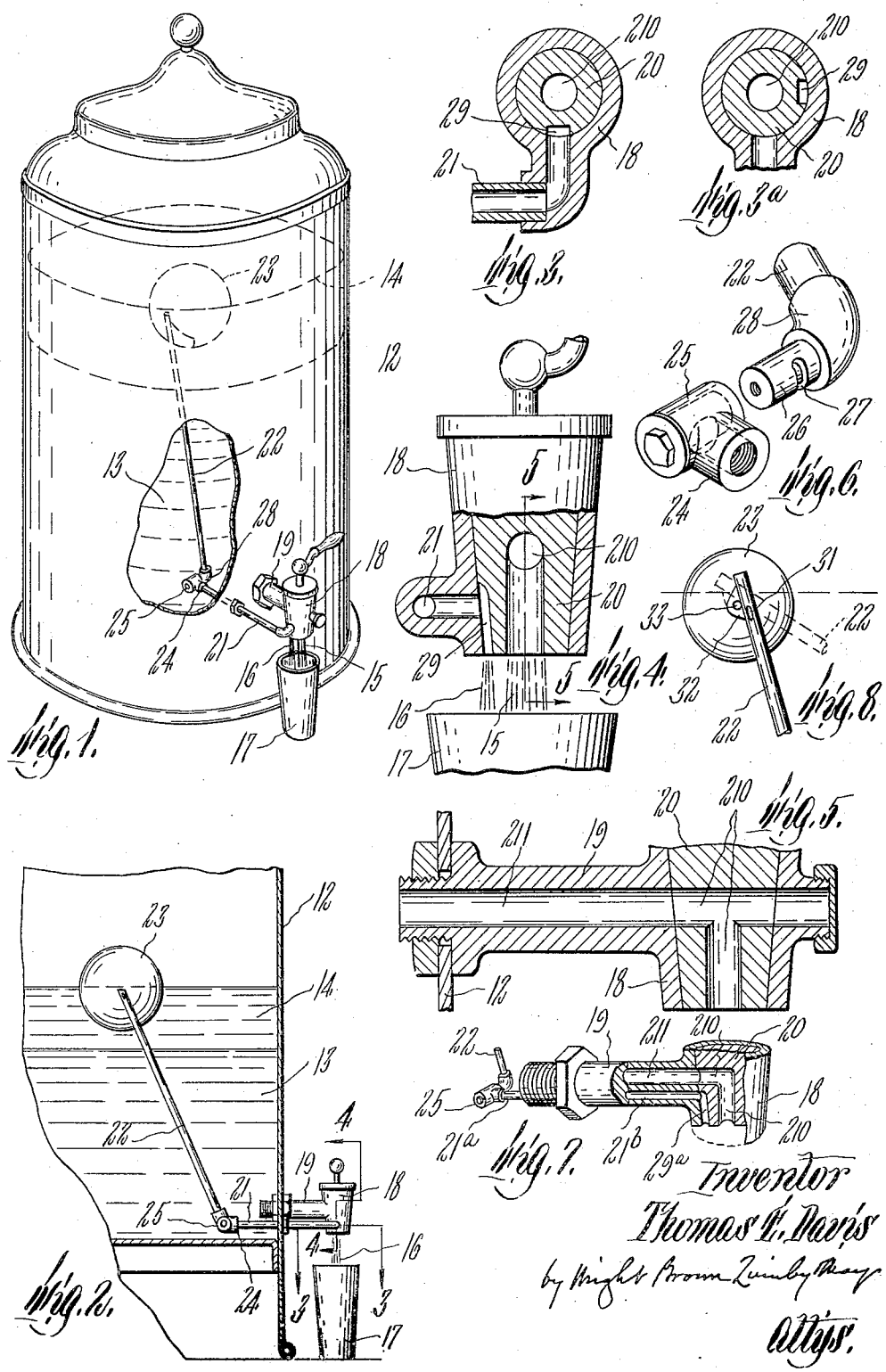

1,893,884

UNITED STATES PATENT OFFICE

THOMAS E. DAVIS, OF ARLINGTON, MASSACHUSETTS

MILK AND CREAM DISPENSER

Application filed December 2, 1931. Serial No. 578,506.

This invention relates to a dispenser adapted to simultaneously deliver milk and cream from a tank to a receiver, the dispenser comprising a faucet including a casing and a plug valve therein, a milk conduit, and a cream conduit, each formed in part by the faucet, the milk conduit receiving milk from the lower portion of the tank and the cream conduit receiving cream from a higher portion of the tank and being controlled by a float adapted to maintain the receiving end of the cream conduit in a stratum of cream above a body of milk.

The object of the invention is to provide a dispensing attachment adapted to be associated with a tank, and to deliver cream and milk in separate streams side by side, each stream being simultaneously visible so that an operator may determine, by inspecting the effluent from the cream conduit, whether such effluent is cream or skim milk, and thus avoid liability of being penalized for dispensing skim milk where cream is understood to be dispensed.

Of the accompanying drawing forming a part of this specification,—

Figure 1 is a perspective view of a dispensing attachment embodying the invention and a tank associated therewith, a portion of the tank being broken away.

Figure 2 shows a portion of the tank in section and the dispensing attachment in side elevation.

Figure 3 is a fragmentary section on line 3—3 of Figure 2.

Figure 3ª is a view similar to Figure 3 showing the faucet closed.

Figure 4 is a fragmentary section on line 4—4 of Figure 2.

Figure 5 is a fragmentary section on line 5—5 of Figure 4.

Figure 6 shows in perspective two members of the cream conduit separated from each other.

Figure 7 is a fragmentary perspective view, partly in section, showing a different embodiment of the invention.

Figure 8 is a fragmentary view showing a portion of the cream conduit and the float thereon.

The same reference characters indicate the same parts in all of the figures.

In the drawing 12 designates a tank adapted to hold a body 13 of milk, and a stratum 14 of cream.

Associated with the tank is a dispensing attachment adapted to deliver a stream 15 of milk, and a stream 16 of cream to a receiver 17, said streams being independent of each other and each visible so that it may be inspected.

An element of said attachment is a faucet casing 18 having a valve seat extending through its lower end and a tubular shank 19 attached to and entering the lower portion of the tank, said shank constituting the fixed conduit hereinafter described.

Fitted to turn in the casing 18 is a plug valve 20 having an angular inner duct 210 (Fig. 5) arranged to communicate with the bore 211 of the fixed conduit 19, and open at the center of the lower end face of the valve, said face being in the open end of the valve seat, said fixed conduit and the angular duct constituting a milk conduit adapted to deliver a stream 15 of milk from the lower portion of the tank.

Another element of the attachment is a flexible conduit which includes a stationary tubular section 21 having a delivering end attached to the faucet casing 18, said section being fixed to and extending into the lower portion of the tank, and a swinging section 22 jointed to the stationary section 21 within the tank, so that it is adapted to swing in a vertical plane.

The receiving upper end of the swinging portion 22 is provided with a float 23 adapted to be supported by the cream stratum, and maintain said receiving end below the top surface of said stratum.

The joint connecting the sections 21 and 22 includes a T shaped tubular member having a nipple portion 24 joined to the stationary portion, and a socket portion 25. A tubular trunnion 26 having a slot 27 is fixed by an elbow 28 to the inner end of the swinging section 22, and fitted to turn in the socket portion 25. A constant communication is maintained by the joint members between the stationary and swinging sections.

The plug valve 20 is provided in one side of its periphery with an outer duct 28 (Figs. 3 and 4) communicating with the delivering end of the fixed section 21 of the flexible conduit, and open at the margin of the lower end of the valve to deliver a stream 16 of cream.

When the valve 20 is turned to the position shown by Figures 3, 4 and 5, the fixed and sectional conduits are simultaneously opened, and when the valve is turned to the position shown by Figure 3ª said conduits are simultaneously closed. The casing and valve may be provided with the usual, or suitable, stop means for limiting the turning movements of the valve in either direction.

In the embodiment shown by Figure 7 the flexible conduit includes a tubular portion 21ª wholly within the tank and fixed to the inner end of the valve casing shank. The conduit portion 21ª communicates with a duct 21ᵇ in the casing shank, said duct constituting a continuation of the cream conduit and having a delivering end communicating with a valve duct 29ª, formed and arranged to function like the outer duct 29 and permit discharge of cream when the valve 20 is turned to the position shown by Figure 7.

The swinging section 22 of the flexible conduit may have a closed outer end and a lateral inlet port 31 spaced below the closed end as shown by Figure 8. The section 22 may also have an ear 32 to which the float 23 is pivoted at 33. The arrangement is such that the inlet port 31 is maintained below the top surface of the stratum of cream when the swinging section 22 is at any angle to which it may be swung.

It will be seen that the valve casing, its valve, the fixed conduit, and the flexible conduit, combined as shown and described, constitute a tell-tale dispensing attachment cooperating with the tank. The term "telltale" is used because the described operation of the attachment enables an operator to inspect the two simultaneously visible streams 15 and 16 and receive information as to the quality of the lacteal fluid composing each stream, so that if the stream 16 ceases to be composed of cream an additional supply of cream may be at once inserted in the tank. The operator is thus enabled to avoid liability of being penalized for dispensing an inferior fluid from the upper portion of a body of lacteal fluid in the tank.

I claim:

A dispensing apparatus including a tank adapted to store a body of lacteal fluid, and a tell-tale dispensing attachment cooperating with the tank, said attachment comprising, in combination, a valve casing having an internal valve seat extending through the lower end of the casing, and a shank constituting a fixed conduit communicating with the lower portion of the tank and with the valve seat, a flexible conduit including a section fixed to and extending through the tank wall, and a swinging section jointed to the fixed section within the tank, and having a float adapted to maintain its free end in close proximity to and below the surface of a body of fluid in the tank, the fixed section of the jointed conduit communicating with the valve seat, and a plug valve movable in the valve seat, and having an exposed face in the open end of said seat, an inner duct arranged to communicate with the fixed conduit and extending to the center of said exposed face, and an outer duct in the periphery of the valve arranged to communicate with the fixed section of the flexible conduit, the plug valve being movable to simultaneously connect the inner duct with the fixed conduit, and the outer duct with the fixed section of the flexible conduit, the arrangement being such that when the tank contains fluid and the valve ducts are connected with the conduits, two independent simultaneously visible streams are discharged from the exposed end of the valve, so that the quality of fluid passing through the two conduits may be determined by an inspection of said streams.

In testimony whereof I have affixed my signature.

THOMAS E. DAVIS.